UNITED STATES PATENT OFFICE.

PERCY HUTCHINS CARTER, HARRY HORACE SHACKELTON, AND THOMAS EDWARD GRAFTON, OF ROME, GEORGIA.

PROCESS OF MAKING ALUMINUM SULFATE.

1,037,591.   Specification of Letters Patent.   Patented Sept. 3, 1912.

No Drawing.   Application filed September 7, 1911. Serial No. 648,219.

*To all whom it may concern:*

Be it known that we, PERCY H. CARTER, HARRY H. SHACKELTON, and THOMAS E. GRAFTON, citizens of Rome, residing at Rome, in the county of Floyd and State of Georgia, have invented certain new and useful Improvements in Processes of Making Aluminum Sulfate, of which the following is a full, clear, and exact specification.

Our invention relates to the treatment of hydrated silicate ores of alumina, and particularly to the treatment of halloysite, a hydrated silicate ore of aluminum of conchoidal fracture, of pearly or waxy, to dull luster, and of the general formula $H_2Al_2Si_2O_9$ and combined water.

As an example of our method, we give the following procedure: After halloysite ore has been ground to the desired fineness, sulfuric acid of 30 degrees strength is added, the amount of hygroscopic water of about 6 per cent. being desirable. The mix is then raised to the temperature of one hundred degrees centigrade, and kept at this temperature until substantially all the aluminum content is dissolved, and the non-aluminum ingredients of the ore precipitated as residue, the separation being effected as stated.

Heretofore halloysite has never been treated on a commercial scale with an acid solvent and the alumina put into solution.

Our process as set forth herein is a new process involving novel principles of treating aluminum ores and further as applied to an ore heretofore not used as a raw material for the manufacture of aluminum sulfate. Our method puts halloysite into solution to the extent of extracting aluminum compounds, and leaving the silica and other ingredients (cobalt, manganese nickel, etc.) in an insoluble form, which ingredients can be afterward extracted from this insoluble residue. Our method produces sulfate of aluminum free of such other ingredients as halloysite may contain.

We have discovered that the ore should be handled observing certain conditions as set forth herein, and that the acid solvent should be added within certain limits and under conditions set forth herein in order to fully realize all the advantages of our invention. The ore is first prepared by grinding, crushing or rolling either in its natural or in moistened state, preferably to a product of uniform fineness. An excess of moisture is not objectionable. Preferably, a portion of the original moisture of the ore should be retained in the ore, but such portion of the original moisture lost in preliminary treatment, may be replaced subsequently. The solvent, preferably sulfuric acid, is of such strength, added under such conditions and maintained at such temperature as to chemically affect the ingredients, and cause separation and solution, as desired.

We instance the following as one example of our process: The ore is converted in either its natural or moistened state to a powder, preferably to a uniform fineness. Water is now added to bring the mix to the desired consistency. The solvent, preferably sulfuric acid, is now added to the mix of desired consistency, and the resulting mixture brought to the desired temperature, the amount of acid of known strength thus added being sufficient to only dissolve the known per cents of alumina at the desired temperature. The mix is preferably gradually heated and maintained at the desired temperature until the aluminum compounds are dissolved to the sulfate form and the other ingredients remain undissolved. By observing the conditions above set forth the solution may be boiled after the reaction has set in without throwing into solution the silica, cobalt, manganese, nickel other ingredients of the ore. The separation is now made of the liquid from the insoluble residue, the liquid containing the sulfate of alumina. Halloysite contains moisture or water of absorption which may be considered in determining the quantity of acid used.

The temperature of the mixture under treatment and the strength of the solvent have a direct relationship, the higher the temperature the less the required strength of the solvent, and vice versa, in all cases the temperature and solvent strength must be so regulated with regard to each other as to produce the desired results to dissolve substantially all the aluminum content of the ore and leave behind substantially all the non-aluminum ingredients of the ore.

It will be seen that our discovery has opened the way for the first time to the successful recovery on a commercial scale of aluminum sulfate from halloysite, or like hydrated silicate ore of aluminum, producing a commercial aluminum salt.

Our invention effects a solution of the aluminum from pulverized hydrated silicate ores in a very short time thereby avoiding the necessity of first calcining aluminum ore as has heretofore been done with certain aluminum ores other than silicates. Prior to our invention, silicated aluminum ores have been considered worthless, because after being calcined they would not yield to chemical treatment. Our process can, under favorable conditions, be carried out within an hour, and requires but a small proportion of sulfuric acid, sufficient to hold the aluminum content in solution at the desired working temperature.

It will be understood that the above example is but one specific way of carrying out our invention, and that our method is not limited to the details given above, as so far as we are aware, we are the first to commercially recover aluminum from the natural silicated ores by chemical treatment.

Having thus described our invention, what we claim as new and desire to secure by Letters Patent is:

1. The herein described method of treating halloysite which consists in treating the raw ore with dilute sulfuric acid to dissolve the aluminum content.

2. The herein described method which consists in treating raw halloysite in the presence of moisture, with sulfuric acid to dissolve the aluminum content.

3. The method which consists in treating raw halloysite in the presence of water with dilute sulfuric acid of sufficient strength to render the alumina soluble in the form of sulfate and leaving behind the manganese, cobalt and nickel and other non-aluminum ingredients of the ore as a residue, and separating the dissolved aluminum content from the residue.

4. The method which consists in treating pulverized uncalcined halloysite in the presence of water with sulfuric acid of sufficient strength with relation to the temperature to render only the aluminum soluble and retain the same in solution, and leaving the non-aluminum constituents undissolved.

5. The method of producing aluminum sulfate which consists in pulverizing raw halloysite, then treating the same in the presence of water with sulfuric acid of sufficient strength with relation to temperature to dissolve substantially all the aluminum content without affecting the other ingredients.

6. The method which consists in treating a pulverized natural silicated ore of aluminum with dilute sulfuric acid to dissolve the aluminum content, and separating the dissolved aluminum content from the residue.

In testimony whereof we affix our signatures in presence of two witnesses.

PERCY HUTCHINS CARTER.
HARRY HORACE SHACKELTON.
THOMAS EDWARD GRAFTON.

Witnesses:
W. O. PARSONS,
P. I. MORRIS.